(12) United States Patent
Ito

(10) Patent No.: US 12,168,440 B2
(45) Date of Patent: Dec. 17, 2024

(54) VEHICLE TRAVEL CONTROL APPARATUS AND VEHICLE TRAVEL CONTROL METHOD

(71) Applicants: DENSO CORPORATION, Kariya (JP); J-QuAD DYNAMICS Inc., Tokyo (JP)

(72) Inventor: Akira Ito, Tokyo (JP)

(73) Assignees: DENSO CORPORATION, Kariya (JP); J-QUAD DYNAMICS INC., Tokyo (JP)

(*) Notice: Subject to any disclaimer, the term of this patent is extended or adjusted under 35 U.S.C. 154(b) by 248 days.

(21) Appl. No.: 17/835,637

(22) Filed: Jun. 8, 2022

(65) Prior Publication Data

US 2023/0001926 A1    Jan. 5, 2023

(30) Foreign Application Priority Data

Jul. 5, 2021    (JP) .................. 2021-111690

(51) Int. Cl.
*B60W 30/16*    (2020.01)

(52) U.S. Cl.
CPC ..... *B60W 30/16* (2013.01); *B60W 2554/4041* (2020.02); *B60W 2554/802* (2020.02); *B60W 2720/10* (2013.01)

(58) Field of Classification Search
CPC ......... B60W 30/16; B60W 2554/4041; B60W 2554/802; B60W 2720/10; B60W 2552/20; B60W 2552/30; B60W 2556/50; B60W 30/18145; B60W 2754/30

USPC .......................................................... 701/96
See application file for complete search history.

(56) References Cited

U.S. PATENT DOCUMENTS

| | | | |
|---|---|---|---|
| 2013/0018531 A1* | 1/2013 | Kumar | B61L 15/0058 701/2 |
| 2019/0047545 A1* | 2/2019 | Gaither | G05D 1/0246 |
| 2020/0201356 A1* | 6/2020 | Schuh | G05D 1/028 |
| 2022/0105933 A1* | 4/2022 | Shieh | G06V 20/584 |

FOREIGN PATENT DOCUMENTS

| | | |
|---|---|---|
| JP | H08-295154 A | 11/1996 |
| JP | 3067584 B2 | 7/2000 |
| JP | 2003-080970 A | 3/2003 |
| JP | 2007-145201 A | 6/2007 |
| JP | 2009-090810 A | 4/2009 |

(Continued)

*Primary Examiner* — Tyler D Paige
(74) *Attorney, Agent, or Firm* — Oliff PLC

(57) ABSTRACT

A vehicle travel control apparatus includes an information acquiring section; a determining section that determines whether a special road terrain exists; and a speed control section that controls a speed of the subject vehicle. The speed control section is further configured to: when the special road terrain exists but a preceding vehicle does not exist, increase or decrease the speed of the subject vehicle with respect to a pre-set vehicle speed in the energy efficiency zone such that the energy efficiency is improved; and when the special road terrain and a preceding vehicle exists and the speed of the subject vehicle is planned to increase in the energy efficiency zone, control the speed of the subject vehicle in an inter-vehicle distance maintenance zone such that the subject vehicle has an inter-vehicle distance to the preceding vehicle longer than a pre-set inter-vehicle distance.

6 Claims, 7 Drawing Sheets

(56) References Cited

FOREIGN PATENT DOCUMENTS

| | | |
|---|---|---|
| JP | 4513247 B2 | 7/2010 |
| JP | 4613124 B2 | 1/2011 |
| JP | 4971094 B2 | 7/2012 |
| JP | 2019-023021 A | 2/2019 |

\* cited by examiner

US 12,168,440 B2

VEHICLE TRAVEL CONTROL APPARATUS AND VEHICLE TRAVEL CONTROL METHOD

CROSS REFERENCE TO RELATED APPLICATION

This application is based on Japanese Patent Application No. 2021-111690 filed on Jul. 5, 2021, the disclosure of which is incorporated herein by reference.

TECHNICAL FIELD

The present disclosure relates to a vehicle travel control apparatus and a vehicle travel control method.

BACKGROUND ART

There has been known a vehicle travel control apparatus that senses a curve located ahead of a subject vehicle, and accelerates or decelerates the subject vehicle in accordance with the sensed curve.

SUMMARY

According to one aspect of the present disclosure, a vehicle travel control apparatus includes: an information acquiring section that is configured to acquire positional information of a current position of a subject vehicle, preceding vehicle information concerning a preceding vehicle travelling in front of the subject vehicle, and road information concerning a road in front of the subject vehicle; a determining section that is configured to determine whether a special road terrain exists in front of the subject vehicle based on the road information, energy efficiency for the subject vehicle being improved as a result of speed control for the subject vehicle by making use of the special road terrain; and a speed control section that is configured to control a speed of the subject vehicle to be a pre-set vehicle speed. A road zone including the special road terrain is defined as an energy efficiency zone. A road zone before the energy efficiency zone is defined as an inter-vehicle distance maintenance zone. The speed control section is further configured to: when the special road terrain does not exist in front of the subject vehicle but a preceding vehicle exists, perform the speed control to control the speed to be the pre-set vehicle speed while maintaining the subject vehicle with at least a pre-set inter-vehicle distance to the preceding vehicle; when the special road terrain exists in front of the subject vehicle but a preceding vehicle does not exist, perform the speed control to increase or decrease the speed of the subject vehicle with respect to the pre-set vehicle speed in the energy efficiency zone such that the energy efficiency is improved; and when the special road terrain exists in front of the subject vehicle, a preceding vehicle exists, and the speed of the subject vehicle is planned to increase with respect to the pre-set vehicle speed in the energy efficiency zone, perform the speed control to control the speed of the subject vehicle in the inter-vehicle distance maintenance zone such that the subject vehicle has an inter-vehicle distance to the preceding vehicle that is longer than the pre-set inter-vehicle distance.

DESCRIPTION OF EMBODIMENTS

Figure 1:
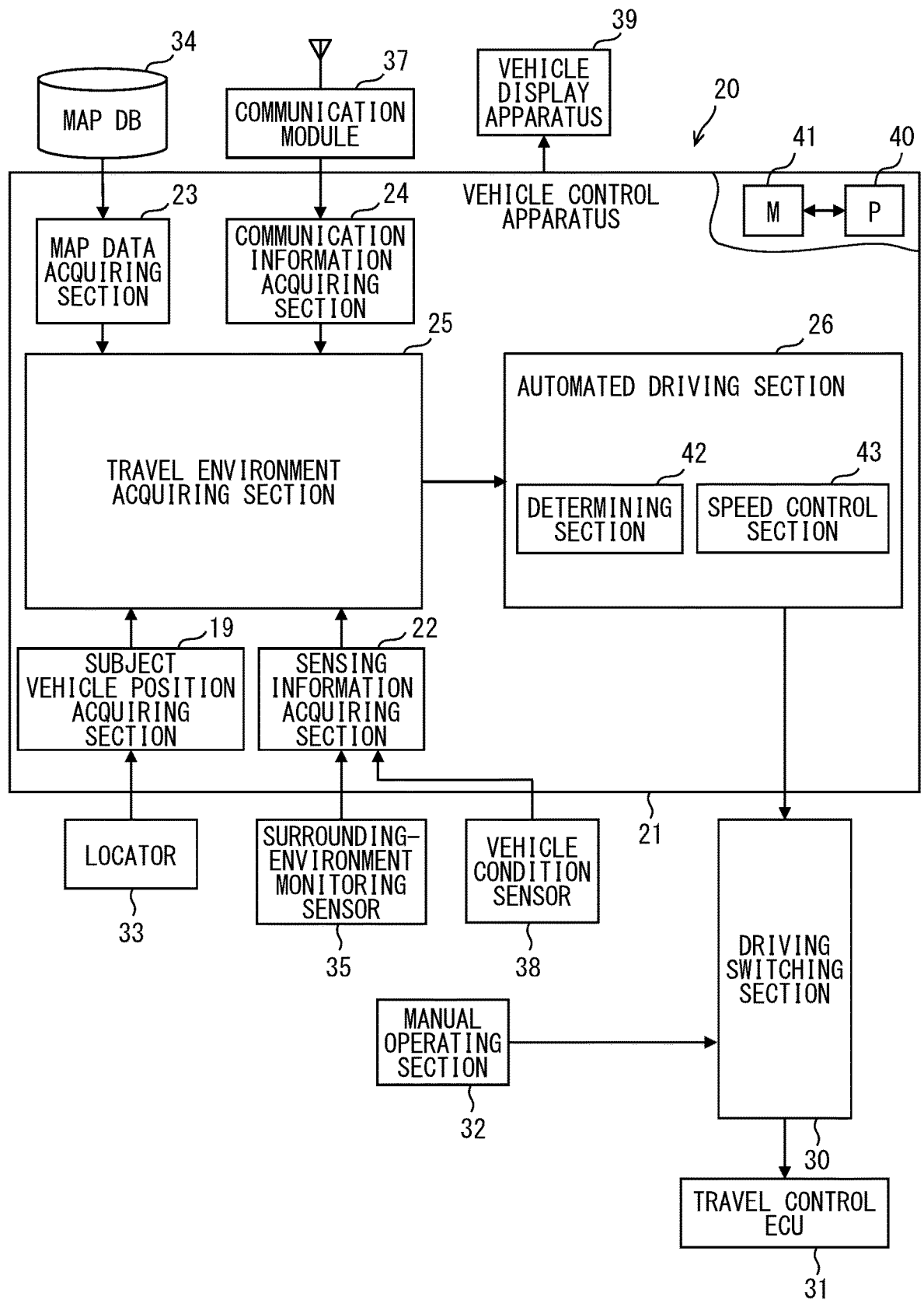
FIG. 1 is a block diagram showing a vehicle system according to a first embodiment.

To begin with, a relevant technology will be described first only for understanding the following embodiments.

A typical vehicle travel control apparatus does not take into consideration whether there is a preceding vehicle. If no preceding vehicle exits, inter-vehicle distance maintenance is not necessary, and, for example, desired acceleration/deceleration control can be realized by vehicle speed correction based on a request from fuel saving control. However, if a preceding vehicle exists, inter-vehicle distance maintenance is also necessary, and how speed control is realized between acceleration/deceleration requests by inter-vehicle distance maintenance control, and fuel saving control is unknown.

In view of the above, an objective of the present disclosure is made in view of the problems as described above, and is to provide a vehicle travel control apparatus and a vehicle travel control method that enable speed control that excel in energy efficiency in accordance with a terrain shape located ahead of a subject vehicle although a preceding vehicle exists.

As described above, according to the one aspect of the present disclosure, a vehicle travel control apparatus includes: an information acquiring section that is configured to acquire positional information of a current position of a subject vehicle, preceding vehicle information concerning a preceding vehicle travelling in front of the subject vehicle, and road information concerning a road in front of the subject vehicle; a determining section that is configured to determine whether a special road terrain exists in front of the subject vehicle based on the road information, energy efficiency for the subject vehicle being improved as a result of speed control for the subject vehicle by making use of the special road terrain; and a speed control section that is configured to control a speed of the subject vehicle to be a pre-set vehicle speed. A road zone including the special road terrain is defined as an energy efficiency zone. A road zone before the energy efficiency zone is defined as an inter-vehicle distance maintenance zone. The speed control section is further configured to: when the special road terrain does not exist in front of the subject vehicle but a preceding vehicle exists, perform the speed control to control the speed to be the pre-set vehicle speed while maintaining the subject vehicle with at least a pre-set inter-vehicle distance to the preceding vehicle; when the special road terrain exists in front of the subject vehicle but a preceding vehicle does not exist, perform the speed control to increase or decrease the speed of the subject vehicle with respect to the pre-set vehicle speed in the energy efficiency zone such that the energy efficiency is improved; and when the special road terrain exists in front of the subject vehicle, a preceding vehicle exists, and the speed of the subject vehicle is planned to increase with respect to the pre-set vehicle speed in the energy efficiency zone, perform the speed control to control the speed of the subject vehicle in the inter-vehicle distance maintenance zone such that the subject vehicle has an inter-vehicle distance to the preceding vehicle that is longer than the pre-set inter-vehicle distance.

According to a second aspect of the present disclosure, a vehicle travel control method is performed by at least one processor to control a speed of a subject vehicle. The vehicle travel control method includes: acquiring positional information of a current position of the subject vehicle, preceding vehicle information concerning a preceding vehicle travelling in front of the subject vehicle, and road information concerning a road in front of the subject vehicle; determining, based on the road information, whether a special road terrain exists in front of the subject vehicle, energy efficiency for the subject vehicle being improved by making use of the special road terrain as a result of speed control that is performed before the subject vehicle travels through the special road terrain; and controlling the speed of the subject vehicle to be a pre-set vehicle speed. A road zone including the special road terrain is defined as an energy efficiency zone. A road zone before the energy efficiency zone is defined as an inter-vehicle distance maintenance zone. Controlling the speed of the subject vehicle to be the pre-set vehicle speed further includes: when the special road terrain does not exist in front of the subject vehicle but a preceding vehicle exists, performing the speed control to control the speed of the subject vehicle to be the pre-set vehicle speed while maintaining the subject vehicle with at least a pre-set inter-vehicle distance to the preceding vehicle; when the special road terrain exists in front of the subject vehicle but a preceding vehicle does not exist, performing the speed control to increase or decrease the speed of the subject vehicle with respect to the pre-set vehicle speed in the energy efficiency zone such that the energy efficiency is improved; when the special road terrain exists in front of the subject vehicle, a preceding vehicle exists, and the vehicle speed is planned to increase with respect to the pre-set vehicle speed in the energy efficiency zone, performing the speed control to control the speed of the subject vehicle in the inter-vehicle distance maintenance zone such that the subject vehicle has an inter-vehicle distance to the preceding vehicle that is longer than the pre-set inter-vehicle distance; and when the special road terrain exists in front of the subject vehicle, a preceding vehicle exists, and the vehicle speed is planned to decrease with respect to the pre-set vehicle speed in the energy efficiency zone, performing the speed control to control the speed of the subject vehicle in the inter-vehicle distance maintenance zone such that the subject vehicle has an inter-vehicle distance to the preceding vehicle that is shorter than the pre-set inter-vehicle distance.

According to a third aspect of the present disclosure, a vehicle travel control apparatus includes: at least one processor programed to: acquire positional information of a current position of a subject vehicle, preceding vehicle information concerning a preceding vehicle travelling in front of the subject vehicle, and road information concerning a road in front of the subject vehicle; determine whether a special road terrain exists in front of the subject vehicle based on the road information, energy efficiency for the subject vehicle being improved as a result of speed control for the subject vehicle by making use of the special road terrain; and control a speed of the subject vehicle to be a pre-set vehicle speed. A road zone including the special road terrain is defined as an energy efficiency zone, and a road zone before the energy efficiency zone is defined as an inter-vehicle distance maintenance zone. The at least one processor is further programmed to: when the special road terrain does not exist in front of the subject vehicle but a preceding vehicle exists, perform the speed control to control the speed to be the pre-set vehicle speed while maintaining the subject vehicle with at least a pre-set inter-vehicle distance to the preceding vehicle; when the special road terrain exists in front of the subject vehicle but a preceding vehicle does not exist, perform the speed control to increase or decrease the speed of the subject vehicle with respect to the pre-set vehicle speed in the energy efficiency zone such that the energy efficiency is improved; and when the special road terrain exists in front of the subject vehicle, a preceding vehicle exists, and the speed of the subject vehicle is planned to increase with respect to the pre-set vehicle speed in the energy efficiency zone, perform the speed control to control the speed of the subject vehicle in the inter-vehicle distance maintenance zone such that the subject vehicle has an inter-vehicle distance to the preceding vehicle that is longer than the pre-set inter-vehicle distance.

According to the vehicle travel control apparatus and the vehicle travel control method, when no special road terrain exists in front of the subject vehicle but a preceding vehicle exits, speed control is performed to control the vehicle speed to be the pre-set vehicle speed while maintaining the inter-vehicle distance with a distance to the preceding vehicle that is longer than the pre-set inter-vehicle distance. Thus, when a preceding vehicle exists, the subject vehicle can travel at a pre-set vehicle speed while maintaining the inter-vehicle distance longer than the pre-set inter-vehicle distance. In addition, when the special road terrain exists and no preceding vehicle exists, speed control is performed to increase or decrease the speed of the subject vehicle relative to the pre-set vehicle speed such that the energy efficiency is enhanced in the energy efficiency zone. Therefore, when no preceding vehicle exists, the subject vehicle can travel at a vehicle speed for enhancing the energy efficiency.

Then, when the special road terrain exists, a preceding vehicle exits, and the vehicle speed is planned to increase relative to the pre-set vehicle speed in the energy efficiency zone, speed control is performed to increase the inter-vehicle distance to be longer than the pre-set inter-vehicle distance in the inter-vehicle distance maintenance zone. In a case that the vehicle speed is increased relative to the pre-set vehicle speed in the energy efficiency zone, it is necessary to increase the inter-vehicle distance because of the existence of the preceding vehicle. Because, in view of this, the inter-vehicle distance is made longer than the pre-set inter-vehicle distance in the closer inter-vehicle distance maintenance zone, it is possible to prevent the subject vehicle from coming closer to the preceding vehicle as a result of a vehicle speed increase in the energy efficiency zone. Thereby, no matter whether or not a preceding vehicle exists, it is possible to implement speed control that excels in energy efficiency in accordance with the special road terrain located ahead of the vehicle.

Next, a plurality of embodiments will be described with reference to the accompanied drawings.

First Embodiment

A first embodiment of the present disclosure is explained by using FIG. 1 to FIG. 9. A vehicle system 20 depicted in FIG. 1 is used in an automated driving vehicle (i.e., a subject vehicle) capable of automated driving. As depicted in FIG. 1, the vehicle system 20 includes a vehicle control apparatus 21, a travel control electronic control unit (Electronic Control Unit: abbreviated to ECU) 31, a locator 33, a map database 34, a surrounding-environment monitoring sensor 35, a communication module 37, a vehicle condition sensor 38, a manual operating section 32, a driving switching section 30, and a vehicle display apparatus 39.

First, the automated driving vehicle is explained. The automated driving vehicle only has to be a vehicle capable of automated driving as mentioned before. As levels of automations which are degrees of automated driving, for example, there are a plurality of levels as defined by SAE. The levels of automation are classified into levels in the following manner according to the definitions by SAE.

Level 0 is a level at which all driving tasks are implemented by a driver without intervention by a system. The driving tasks are steering, and acceleration/deceleration, for example. Level 0 is equivalent to so-called manual driving using the manual operating section 32. Level 1 is a level at which a system assists either steering or acceleration/deceleration. Level 2 is a level at which a system assists both steering, and acceleration/deceleration. Level 1 and Level 2 are equivalent to so-called driving assistance.

Level 3 is a level at which a system can implement all driving tasks at particular locations such as freeways and the like, and a driver performs driving operation at time of emergency. At Level 3, the driver is required to be able to act in response promptly in a case that a system requests the driver to take over driving. Level 3 is equivalent to so-called conditional automated driving. Level 4 is a level at which a system can implement all driving tasks except under particular situations such roads that cannot be handled by the system, extreme environments and the like. Level 4 is equivalent to so-called advanced automated driving. Level 5 is a level at which a system can implement all driving tasks in every possible environment. Level 5 is equivalent to so-called fully automated driving. The level is equivalent to so-called automated driving.

For example, the automated driving vehicle according to the present embodiment may be an automated driving vehicle whose level of automation is Level 3 or may be an automated driving vehicle whose level of automation is Level 4 or higher. In addition, the level of automation may be able to be switched. In the present embodiment, the level of automation can be switched to automated driving at Automation Level 3 or higher and to manual driving at Level 0.

Next, the configuration of each section is explained. The locator 33 includes a GNSS (Global Navigation Satellite System) receiver and an inertia sensor. The GNSS receiver receives positioning signals from a plurality of positioning satellites. The inertia sensor includes a gyro sensor, and an acceleration sensor, for example. The locator 33 combines the positioning signal received at the GNSS receiver with measurement results of the inertia sensor, and thereby serially measures the vehicle position of the subject vehicle. It is supposed that the vehicle position is represented by coordinates of latitudes/longitudes, for example. Note that in another possible configuration, measurement of the vehicle position may use a travelled distance determined from signals serially output from a vehicle speed sensor mounted on the vehicle.

The map database 34 is a non-volatile memory, and has stored thereon map data about link data, node data, road shapes, structures, and the like. The link data includes pieces of data such as link IDs identifying links, link lengths representing the lengths of the links, link azimuths, link travel time, link shapes, node coordinates of the start points and end points of the links or road attributes. For example, the link shapes may be ones represented by coordinate sequences representing the coordinate positions of both ends of each link, and shape-interpolating points representing the shape therebetween. Examples of the road attributes include road names, road types, road widths, lane count information representing the numbers of lanes, speed regulation values, and the like. The node data includes pieces of data such as node IDs which are unique numbers given to nodes on a map, node coordinates, node names, node types or connection link IDs representing link IDs of links connected to the nodes. In another possible configuration, the link data may be not only defined for each road zone, but also subdefined for each lane, that is, each driving lane.

It may be made possible to identify, from lane count information and/or road types, which of multiple lanes on each side, a single lane on each side, a road with two way traffic without a center line, and the like a road zone, that is, links, correspond (corresponds) to. Roads with two way traffic without center lines do not include roads with one way traffic. The roads with two way traffic without center lines mentioned here represent roads with two way traffic without center lines in local roads excluding freeways, and roads dedicated for automobiles.

The map data may include 3D maps including point clouds of feature points of road shapes and structures. In a case that 3D maps including point clouds of feature points of road shapes and structures are used as the map data, the locator 33 may not use the GNSS receiver, but use the 3D maps, and sensing results of the surrounding-environment monitoring sensor 35 such as a LIDAR (Light Detection and Ranging/Laser Imaging Detection and Ranging) or a surrounding-environment monitoring camera that senses point clouds of feature points of road shapes and structures to identify the subject vehicle position, in another possible configuration. Note that the 3D maps may be ones that are generated on the basis of captured images by REM (Road Experience Management).

The surrounding-environment monitoring sensor 35 is an autonomous sensor that monitors the surrounding environment of the subject vehicle. For example, the surrounding-environment monitoring sensor 35 senses objects near the subject vehicle like pedestrians, animals other than humans, moving bodies that are moving such as vehicles other than the subject vehicle or stationary objects that are stationary such as guardrails, curb stones, trees or fallen objects on roads. Other than these, the surrounding-environment monitoring sensor 35 also senses road markings near the subject vehicle such as lane markings. Examples of the surrounding-environment monitoring sensor 35 include a surrounding-environment monitoring camera that captures images of a predetermined area near the subject vehicle, and distance measurement sensors that transmit scanning waves to a predetermined area near the subject vehicle such as a millimeter wave radar, a sonar or a LIDAR, for example.

The vehicle condition sensor 38 is a sensor group for sensing various types of condition of the subject vehicle. Examples of the vehicle condition sensor 38 include a vehicle speed sensor, a steering sensor, an acceleration sensor, a yaw rate sensor, and the like. The vehicle speed sensor senses the vehicle speed of the subject vehicle. The steering sensor senses the steering angle of the subject vehicle. The acceleration sensor senses accelerations such as the forward/backward accelerations or lateral accelerations of the subject vehicle. The acceleration sensor may be one that senses also a deceleration which is a negative acceleration. The yaw rate sensor senses the angular speed of the subject vehicle.

The communication module 37 performs vehicle-to-vehicle communication which is transmission and reception of information via wireless communication with a communication module 37 of a vehicle system 20 mounted on a nearby vehicle of the subject vehicle. In addition, the communication module 37 may perform road-to-vehicle communication which is transmission and reception of information via wireless communication with a roadside unit installed at the roadside. In this case, the communication module 37 may receive information about a nearby vehicle of the subject vehicle transmitted from a communication module 37 of a vehicle system 20 mounted on the nearby vehicle via the roadside unit.

In addition, the communication module 37 may perform wide area communication which is transmission and reception of information via wireless communication with a facility located outside the subject vehicle. In a case that information is transmitted and received between vehicles via a facility by wide area communication, information including vehicle positions may be transmitted and received, and thereby the facility may make adjustments such that information about vehicles in a certain area are transmitted and received between the vehicles on the basis of the vehicle positions. In cases that are explained as examples below, the communication module 37 receives information about a nearby vehicle of the subject vehicle by at least any of vehicle-to-vehicle communication, road-to-vehicle communication, and wide area communication.

Other than these, the communication module 37 may receive, for example by wide area communication, map data distributed from an external server that distributes map data, and store the map data on the map database 34. In this case, in another possible configuration, the map database 34 may be a volatile memory, and the communication module 37 may serially acquire map data of a region according to the subject vehicle position.

The manual operating section 32 is a portion for a driver to operate for driving the subject vehicle, and includes a steering wheel, an accelerator pedal, and a brake pedal. The manual operating section 32 outputs, to the driving switching section 30, operation amounts corresponding to operation by the driver. The operation amounts are an accelerator operation amount, a brake operation amount, and a steer operation amount. The vehicle control apparatus 21 outputs an instruction value for executing automated driving in a case of an automated driving mode.

The driving switching section 30 switches the driving mode between an automated driving mode in which automated driving is performed, and a manual driving mode in which manual driving is performed. In other words, the driving switching section 30 switches whether the right to perform driving operation of the subject vehicle 100 is given to the vehicle control apparatus 21 or to the driver. In a case that the right to perform driving operation of the subject vehicle 100 is given to the vehicle control apparatus 21, the driving switching section 30 transfers instruction values output from the vehicle control apparatus 21 to the travel control ECU. In a case that the right to perform driving operation of the subject vehicle 100 is given to the driver, the driving switching section 30 transfers operation amounts to the travel control ECU.

In accordance with a mode switching request, the driving switching section 30 switches the driving mode to the automated driving mode or the manual driving mode. There are two types of mode switching request which are a manual driving mode switching request for switching the driving mode from the automated driving mode to the manual driving mode, and an automated driving mode switching request for switching the driving mode from the manual driving mode to the automated driving mode. For example, the mode switching requests are generated by switch operation by the driver, and are input to the driving switching section 30. In addition, for example, the mode switching request are generated by determinations by the vehicle control apparatus 21, and are input to the driving switching section 30. In accordance with the mode switching requests, the driving switching section 30 switches the driving mode.

In the automated driving mode which is also referred to as adaptive cruise control in the present embodiment, a set speed set by the driver is maintained without keeping stepping on the accelerator pedal. In addition, in the adaptive cruise control, in a case that there is a preceding vehicle 101, control is performed to follow the preceding vehicle 101 while the inter-vehicle distance to the preceding vehicle 101 is kept constant.

The adaptive cruise control is started and ended in accordance with switch operation by the driver. In addition, the adaptive cruise control ends temporarily or completely also in a case that various end conditions such as a condition that the driver has stepped on the accelerator pedal or the brake pedal are satisfied. In addition, a desired travel speed is set when the adaptive cruise control functionality is enabled by switch operation by the driver.

The travel control ECU 31 is a travel control section, and is an electronic control unit that performs travel control of the subject vehicle 100. Examples of the travel control include acceleration/deceleration control, and/or steering control. The travel control ECU 31 includes a steering ECU that performs steering control, a power unit control ECU and a brake ECU that perform acceleration/deceleration control, and the like. The travel control ECU 31 performs travel control by outputting control signals to travel control devices such as an electronic control throttle, a brake actuator or an EPS (Electric Power Steering) motor mounted on the subject vehicle.

The vehicle display apparatus 39 is mounted on the vehicle, and is applied to a combination meter apparatus or a facility information display apparatus, for example. For example, the combination meter apparatus displays various types of vehicle information such as the vehicle speed, the engine revolution speed, the travelling fuel efficiency or the travelable range. In addition, for example, the facility information display apparatus displays various types of apparatus information related to a car navigation apparatus, a car air-conditioner apparatus, a car audio apparatus, and the like.

In addition, the vehicle display apparatus 39 is controlled by the vehicle control apparatus 21, and displays various types of information. The various types of information also includes automated driving information related to automated driving, in addition to the information mentioned before. The automated driving information includes an automated driving mode being executed, a pre-set vehicle speed having been set by the driver, an inter-vehicle distance set by the system, and notification information. The notification information is information representing that speed control for enhancing the energy efficiency is planned to be implemented or is being implemented. Specifically, the notification information is information representing that a fuel saving mode that prioritizes fuel saving automated driving is being implemented, or information representing that the fuel saving mode is planned to be implemented in the coming future in a particular zone located ahead.

The vehicle control apparatus 21 includes at least one processor 40, a memory 41, an I/O, and a bus connecting them, and executes processes related to automated driving by executing a control program stored on the memory 41. The memory 41 mentioned here is a non-transitory tangible storage medium (non-transitory tangible storage medium) that non-transitorily stores computer-readable programs and data. In addition, the non-transitory tangible storage medium is realized by a semiconductor memory, a magnetic disk or the like.

Next, the schematic configuration of the vehicle control apparatus 21 is explained by using FIG. 1. As depicted in FIG. 1, the vehicle control apparatus 21 includes, as functional blocks, a subject vehicle position acquiring section 19, a sensing information acquiring section 22, a map data acquiring section 23, a communication information acquiring section 24, a travel environment acquiring section 25, and an automated driving section 26. Note that some or all of the functionalities executed by the vehicle control apparatus 21 may be configured as hardware by using one or more ICs or the like. In addition, some or all of the functional blocks included in the vehicle control apparatus 21 may be realized by a combination of execution of software by the processor 40 and hardware members. The vehicle control apparatus 21 has functionalities of a vehicle travel control apparatus that controls travelling of the vehicle.

The subject vehicle position acquiring section 19 acquires the vehicle position of the subject vehicle 100 that is serially measured by the locator 33. The subject vehicle position acquiring section 19 functions as an information acquiring section that acquires positional information related to the current position of the subject vehicle 100. For example, the positional information is information about coordinates of latitudes/longitudes representing the vehicle position.

The sensing information acquiring section 22 acquires sensing information which is sensing results serially sensed by the surrounding-environment monitoring sensor 35. In addition, the sensing information acquiring section 22 acquires vehicle condition information which is sensing results serially sensed by the vehicle condition sensor 38. The sensing information acquiring section 22 functions as an information acquiring section that acquires preceding vehicle information related to a preceding vehicle 101 travelling ahead of the subject vehicle 100. For example, the preceding vehicle information is the inter-vehicle distance between the preceding vehicle 101 and the subject vehicle 100, and the vehicle speed of the preceding vehicle 101.

The map data acquiring section 23 acquires map data stored on the map database 34. In accordance with the vehicle position of the subject vehicle 100 acquired at the subject vehicle position acquiring section 19, the map data acquiring section 23 may acquire map data of a location where the subject vehicle is. The map data acquiring section 23 preferably acquires map data of an area which is larger than the range of sensing of the surrounding-environment monitoring sensor 35. The map data acquiring section 23 functions as an information acquiring section that acquires road information related to a road located ahead of the subject vehicle 100. For example, the road information is the gradient of a road located ahead, the curvature of the road, and the cross fall (cant) of the road.

The communication information acquiring section 24 acquires, at the communication module 37, information about nearby vehicles of the subject vehicle. Examples of the information about nearby vehicles include, for example, identification information about the nearby vehicles, information about the speeds, information about the accelerations, information about the yaw rates, positional information, and the like. The identification information is information for identifying individual vehicles.

The travel environment acquiring section 25 acquires a travel environment of the subject vehicle 100, and generates a virtual space simulating the acquired travel environment for the automated driving section 26. Specifically, the travel environment acquiring section 25 recognizes the travel environment of the subject vehicle 100 from the vehicle position of the subject vehicle 100 acquired at the subject vehicle position acquiring section 19, the sensing information and vehicle condition information acquired at the sensing information acquiring section 22, the map data acquired at the map data acquiring section 23, the information about nearby vehicles acquired at the communication information acquiring section 24, and the like. For example, by using these pieces of information, the travel environment acquiring section 25 recognizes the position, shape, movement condition, and the like of a nearby object of the subject vehicle 100, the position, and the like of a nearby road marking of the subject vehicle 100, and so on, and generates a virtual space reproducing the actual travel environment.

From the sensing information acquired at the sensing information acquiring section 22, the travel environment acquiring section 25 may recognize, as the travel environment, also the distance to a nearby object of the subject vehicle 100, the relative speed of the nearby object relative to the subject vehicle 100, the shape, and size of the nearby object, and the like. In addition, in a case that the communication information acquiring section 24 can acquire information about nearby vehicles, the travel environment acquiring section 25 may be configured to recognize the travel environment by using the information about the nearby vehicles. For example, from information such as the position, speed, acceleration or yaw rate of a nearby vehicle, the travel environment acquiring section 25 may recognize the position, speed, acceleration, yaw rate, and the like of the nearby vehicle. In addition, from identification information about the nearby vehicle, performance information about the nearby vehicle such as the maximum deceleration or the maximum acceleration may be recognized. For example, in one possible configuration, by storing correspondences between identification information and performance information in advance on the memory 41 of the vehicle control apparatus 21, performance information may be recognized from identification information by referring to the correspondences.

The travel environment acquiring section 25 preferably recognizes nearby objects sensed at the surrounding-environment monitoring sensor 35, making distinctions as to whether the nearby objects are moving bodies or stationary objects. In addition, the travel environment acquiring section 25 preferably recognizes nearby objects making distinctions as to their types. For example, the types of nearby objects may be recognized making distinctions therebetween by performing pattern matching using captured images of the surrounding-environment monitoring camera. The types which may be recognized and between which distinctions may be made are, for example, structures such as guardrails, fallen objects on roads, pedestrian, bicycles, motorcycles, automobiles, and the like.

The automated driving section 26 performs a process related to driving operation performed in place of the driver. As depicted in FIG. 1, the automated driving section 26 includes a determining section 42 and a speed control section 43, as functional blocks.

By using the travel environment acquired at the travel environment acquiring section 25, the automated driving section 26 implements vehicle control for causing the subject vehicle 100 to travel by automated driving. The automated driving section 26 causes the travel control ECU 31 to automatically perform acceleration/deceleration, and/or steering to thereby perform driving operation in place of the driver, that is, perform automated driving. In the present embodiment, the automated driving section 26 executes the adaptive cruise control mentioned before.

The determining section 42 uses the road information to determine whether a special road terrain that contributes to enhancement of the energy efficiency as a result of speed control is located ahead. The special road terrain is a terrain that contributes to improving the energy efficiency as a result of speed control that is performed before the subject vehicle enters the special road terrain. In other words, the energy efficiency for the subject vehicle can be improved by making use of the special road terrain by controlling the speed of the subject vehicle before the subject vehicle reaches the special road terrain. The special road terrain is such a terrain that the energy consumption can be reduced more if acceleration/deceleration control is adjusted relative to a pre-set vehicle speed as compared with a situation where the subject vehicle travels at the constant pre-set vehicle speed. The special road terrain is also referred to as a fuel saving control implementation area. For example, the special road terrain is a sag section. At a sag section, the subject vehicle is accelerated in advance at the downhill, and prepares for the uphill by gaining inertia. This can contribute to improving the energy efficiency. Enhancement or improvement of the energy efficiency is a synonym of reduction of the combustion consumption in a case of a gasoline-powered car, and is a synonym of reduction of the electrical power consumption in a case of an electric car. Speed control for enhancing the energy efficiency is referred to as fuel saving control below in some cases. In addition, a road zone including the special road terrain is defines as an energy efficiency zone. The energy efficiency zone includes the special road terrain, and has predetermined zones before and after it, for example zones with lengths which are equal to 500 m. A predetermined zone is set before the special road terrain at such a distance that the degree of contribution to enhancement of the energy efficiency attained by implementing acceleration/deceleration control based on fuel saving control is high. Accordingly, if the predetermined zone has only a length which is equal to several meters, since its starting point is too close to the special road terrain, necessary acceleration/deceleration control cannot be enough performed; in addition, if the predetermined zone has a length which is equal to several kilometers, since the starting point is too far from the special road terrain, the degree of contribution of acceleration/deceleration control is small. In addition, a road zone before the energy efficiency zone is defined as an inter-vehicle distance maintenance zone.

The speed control section 43 controls the speed of the subject vehicle 100 on the basis of a pre-set vehicle speed that has been set in advance, and a pre-set inter-vehicle distance that has been set in advance. The speed control section 43 controls the pre-set vehicle speed and the pre-set inter-vehicle distance such that the pre-set vehicle speed has a tolerance of ±several km/h, the pre-set inter-vehicle distance has a tolerance of approximately ±several dozen meters, and the energy efficiency is enhanced within the ranges of the tolerances.

In a case that there are no preceding vehicles 101, inter-vehicle distance maintenance is not necessary, and desired acceleration/deceleration control can be realized by vehicle speed correction based on a request from fuel saving control. However, in a case that there is a preceding vehicle 101, it is also necessary to maintain an inter-vehicle distance, and a conflict occurs between acceleration/deceleration requests by inter-vehicle distance maintenance control and fuel saving control in some cases.

In view of this, the pre-set inter-vehicle distance is given a tolerance of approximately ±several dozen meters as described above. In a case that it is expected that the subject vehicle enters a road with a special road terrain, the inter-vehicle distance is artificially adjusted within the tolerance of the pre-set inter-vehicle distance in advance, a conflict between an acceleration/deceleration request by inter-vehicle distance maintenance control and fuel saving control is avoided, and enhancement of the energy efficiency is realized. For example, control is performed such that the inter-vehicle distance is increased in advance in a case that an acceleration request is expected in the special road terrain, the inter-vehicle distance is reduced in advance in a case that a deceleration request is expected in the special road terrain, and so on. The tolerances of the pre-set inter-vehicle distance and pre-set vehicle speed are changed at any time to values set taking into consideration information about surrounding traffic obtained from the surrounding-environment monitoring sensor 35, for example, about a situation related to following vehicles, and the like, to thereby give careful consideration to nearby vehicles also.

Specifically, the speed control section 43 sequentially corrects a pre-set vehicle speed Vset, and a pre-set inter-vehicle distance δset on the basis of a fuel saving request, and a request to follow a preceding vehicle 101, and calculates a target vehicle speed Vref, and a target inter-vehicle distance δref. Then, feedback control is performed such that the target vehicle speed, and the actual speed match, and the actual inter-vehicle distance becomes equal to or longer than the target inter-vehicle distance. Note that tolerances α and β given to the pre-set vehicle speed, and the pre-set inter-vehicle distance are set to ±several km/h, and ±several dozen meters, respectively, and are variable in accordance with the situation related to nearby vehicles. Thereby, careful consideration is given to surrounding traffic.

Figure 2:
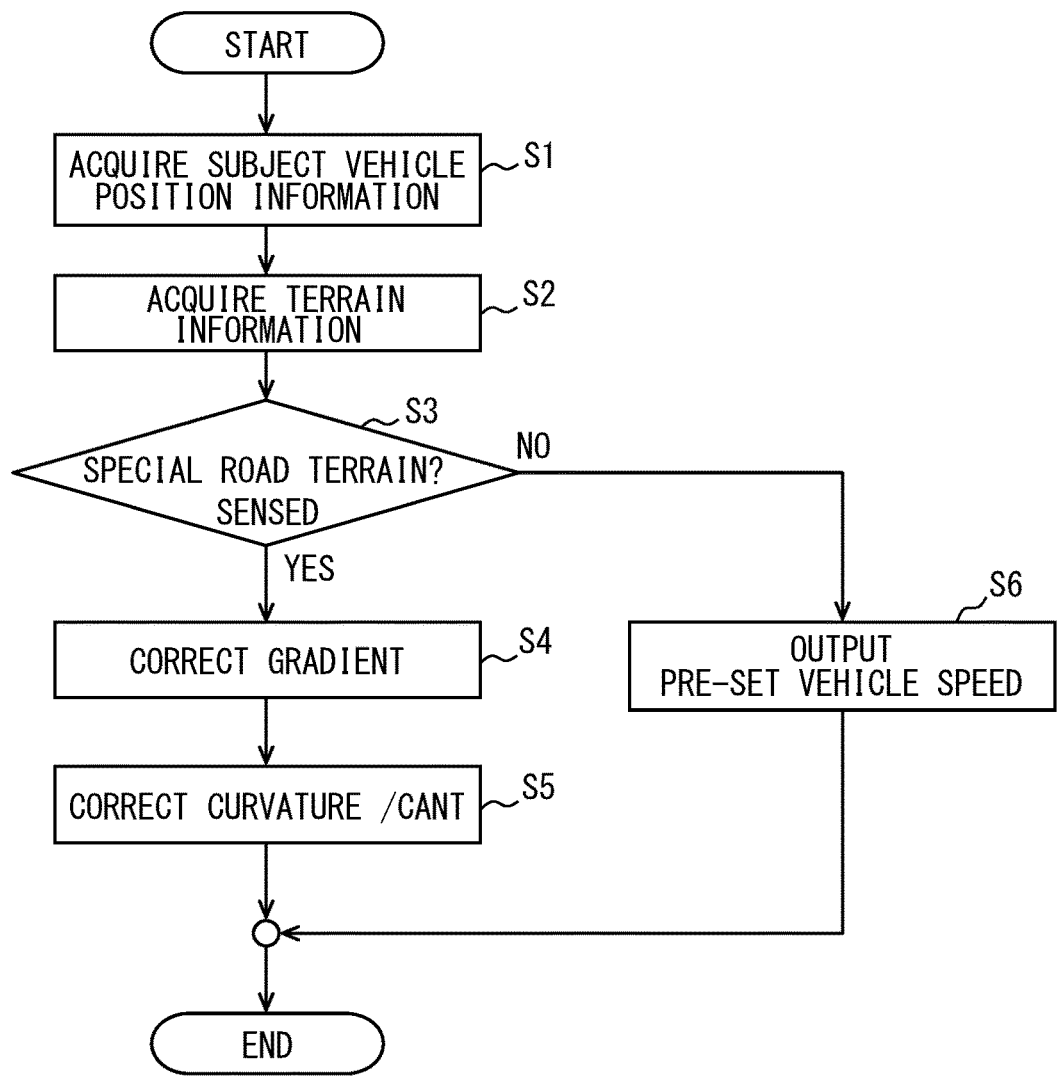
FIG. 2 is a flowchart showing vehicle speed correction control performed when no preceding vehicle exists.

Next, a process of the automated driving section 26 will be described based on a flowchart shown in FIG. 2. The process of FIG. 2 is started by the automated driving section 26 when the process proceeds to Step S19 in FIG. 4 which will be described later. The process shown in FIG. 2 is a process for correcting an output vehicle speed, if necessary, relative to a pre-set vehicle speed. In addition, the process shown in FIG. 2 is a process performed when no preceding vehicle 101 exists.

At Step S1, positional information of the subject vehicle 100 is acquired, and the process proceeds to Step S2. At Step S2, information about a road located ahead of the subject vehicle 100 is acquired, and the process proceeds to Step S3. At Step S3, the road information is used to determine whether or not a special road terrain exists in front of the subject vehicle. In a case that there is a special road terrain, the process proceeds to Step S4, and in a case that there are no special road terrains, the process proceeds to Step S6. At Step S6, because there are no special road terrains, the pre-set vehicle speed having been set is output, and this procedure ends.

At Step S4, because there is a special road terrain, gradient correction is implemented, and the process proceeds to Step S5. At Step S4, in accordance with the special road terrain, an optimal vehicle speed for improving the energy efficiency is calculated. For example, in a case that the subject vehicle is travelling on a downhill at a sag section, the target vehicle speed is corrected to increase, and in a case that the subject vehicle is travelling on an uphill thereafter, the target vehicle speed is corrected to decrease. Such correction is for increasing the target vehicle speed on the downhill, and travelling on the uphill efficiently by taking advantage of the inertia. Because the actual vehicle speed decreases on the uphill, it would be necessary to operate a driving portion of the subject vehicle promptly if the target vehicle speed remains unchanged after the downhill. However, by reducing the target vehicle speed on the uphill, the driving portion can be operated after the inertia is used effectively, and the energy efficiency can be enhanced. In addition, at the correction at Step S4, the correction is performed within the range of the tolerance as described above.

At Step S5, curvature correction, and cant correction are implemented, the pre-set vehicle speed after corrected is output, and this procedure ends. At Step S5, the optimal vehicle speed that excels in the energy efficiency at Step S4 is corrected to a vehicle speed at which the subject vehicle can travel safely based on the curvature and the cant. For example, in a case that a side slip occurs if the subject vehicle travels at the vehicle speed calculated at Step S4, the vehicle speed is corrected to a vehicle speed for preventing a side slip. At the correction at Step S5, the correction is performed within the range of the tolerance as mentioned before.

In this manner, when a special road terrain exists ahead of the subject vehicle and no preceding vehicle 101 exists, the speed control section 43 performs speed control such that the speed of the subject vehicle 100 increases or decreases relative to the pre-set vehicle speed such that the energy efficiency is improved in the energy efficiency zone.

Figure 3:
FIG. 3 is a figure for explaining an inter-vehicle distance adjustment region.

Next, speed control performed when a preceding vehicle 101 exists will be described. In a case that there is a preceding vehicle 101 as depicted in FIG. 3, target speed calculation for keeping an appropriate inter-vehicle distance to the preceding vehicle 101 in an inter-vehicle distance adjustment region is performed.

Here, supposing that the inter-vehicle time is h, the minimum inter-vehicle distance is δmin, the speed of the preceding vehicle 101 is Vp, the position of the preceding vehicle 101 is Xp, the speed of the subject vehicle 100 is Vh, and the position of the subject vehicle 100 is Xh, the inter-vehicle distance δ is represented by the following Formula (1).

$$\delta = Xp - Xh \quad (1)$$

In addition, the target inter-vehicle distance δref is represented by the following Formula (2).

$$\delta ref = h \cdot Vh + \delta \min \quad (2)$$

The inter-vehicle distance adjustment region is a zone represented by δ≤δref as depicted in FIG. 3. In addition, if the subject vehicle is expected to pass a special road terrain that matches fuel saving control such as a gradient change in the coming future, the subject vehicle prepares for fuel saving control by adjusting the inter-vehicle distance to the preceding vehicle 101 in advance in order to ensure room for acceleration/deceleration control.

Figure 4:
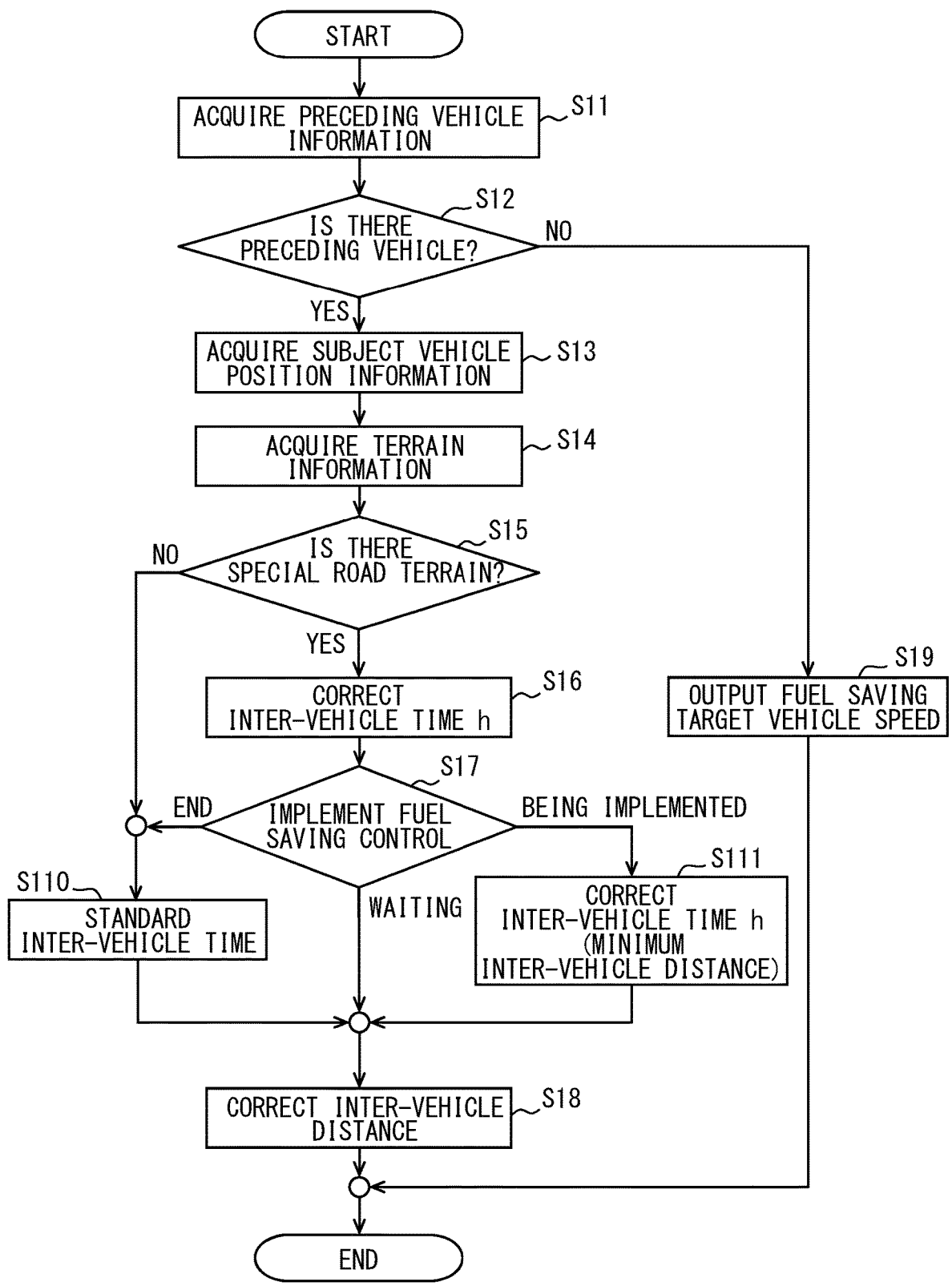
FIG. 4 is a flowchart showing vehicle speed correction control according to the existence of a preceding vehicle.

Next, speed control depending on whether a preceding vehicle 101 exists is explained using a flowchart in FIG. 4. A process depicted in FIG. 4 is executed repeatedly in a short time by the automated driving section 26. The process depicted in FIG. 4 is a process for correcting an output vehicle speed relative to a pre-set vehicle speed.

At Step S11, preceding vehicle information is acquired, and the process proceeds to Step S13. The preceding vehicle information is information acquired by the sensing information acquiring section 22 and is information including the inter-vehicle distance between the preceding vehicle 101 and the subject vehicle 100, the vehicle speed of the preceding vehicle 101, and the like.

At Step S12, on the basis of the preceding vehicle information, it is determined whether or not there is a preceding vehicle 101. If a preceding vehicle 101 exists, the process proceeds to Step S13, and if no preceding vehicles 101 exists, the process proceeds to Step S19. At Step S19, the flowchart depicted in FIG. 2 mentioned before is implemented, and this procedure ends.

At Step S13, because the preceding vehicle 101 exists, positional information of the subject vehicle 100 is acquired, and the process proceeds to Step S13. At Step S14, information about a road located ahead is acquired, and the process proceeds to Step S15.

At Step S15, on the basis of the information about the road located ahead, it is determined whether there is a special road terrain. In a case that there is a special road terrain, the process proceeds to Step S16, and in a case that there are no special road terrains, the process proceeds to Step S110. In a case that there is a special road terrain within a predetermined distance on a route ahead of the vehicle, for example within 100 m, it is determined that a special road terrain exists in front of the subject vehicle. The predetermined distance used for determining whether or not there is a special road terrain is such a distance that, for example, if acceleration/deceleration control is performed with a tolerable acceleration at a location the predetermined distance before the special road terrain, this control would contribute to improving the energy efficiency. Accordingly, if the predetermined distance is several meters before the special road terrain, contribution to improving the energy efficiency would be small, and if the predetermined distance is 1 km or the like from the special road terrain, contribution to improving the energy efficiency would be also small.

At Step S16, because there is the special road terrain, the inter-vehicle time h is corrected, and the process proceeds to Step S17. The correction of the inter-vehicle time h is performed within the range of a tolerance β relative to the pre-set inter-vehicle distance δset such that the target inter-vehicle distance δref prioritizing fuel saving control is realized.

At Step S17, it is determined that fuel saving control is being currently implemented, is waiting for implementation, or is not implemented. If the fuel saving control is being implemented, the process proceeds to Step S111. If the fuel saving control is waiting for being implemented, the process proceeds to Step S118. If the fuel saving control is not being implemented, the process proceeds to Step S110.

At Step S111, because the fuel saving control is being implemented, the inter-vehicle time h is corrected, and the process proceeds to Step S18. At Step S110, because the fuel saving control is not being implemented, the inter-vehicle time is set to a standard time, and the process proceeds to Step S18. At Step S18, inter-vehicle distance maintenance correction control, which will be described later, is implemented, and this procedure ends.

As depicted in Step S110, if there is no special road terrain located ahead and additionally there is a preceding vehicle 101, the speed control section 43 performs speed control to control the vehicle speed to be the pre-set vehicle speed while maintaining the subject vehicle with an inter-vehicle distance which is longer than the pre-set inter-vehicle distance.

Figure 5:
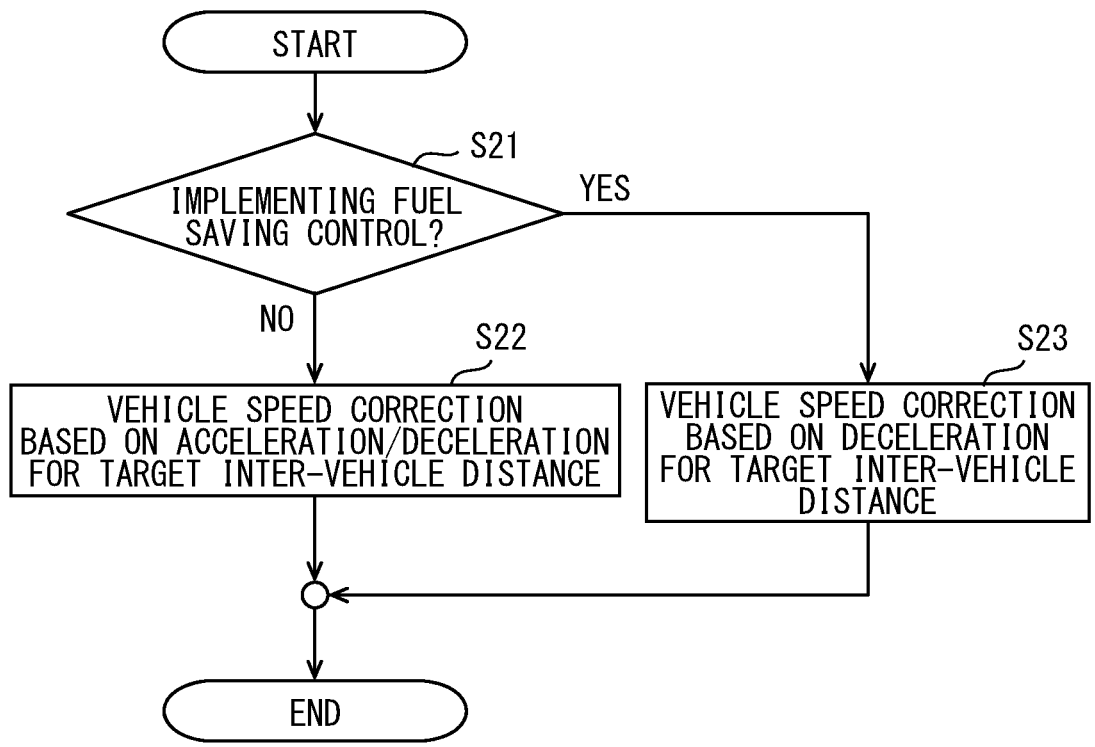
FIG. 5 is a flowchart showing vehicle speed correction control according to the execution of fuel saving control.

Next, the inter-vehicle distance maintenance correction control is explained. A process depicted in FIG. 5 is started when Step S18 in FIG. 4 is reached. At Step S21, it is determined whether or not fuel saving control is being implemented. In a case that fuel saving control is being implemented, the process proceeds to Step S23. In a case that fuel saving control is not being implemented, the process proceeds to Step S22.

At Step S22, because the fuel saving control is not being implemented, but is waiting for being implemented or is not being implemented, vehicle speed correction based on acceleration/deceleration toward the target inter-vehicle distance is implemented, and this procedure ends. At Step S23, because the fuel saving control is being implemented, vehicle speed correction based on only deceleration toward the target inter-vehicle distance is implemented, and this procedure ends.

In this manner, deceleration is performed only if the inter-vehicle distance is shorter than the target inter-vehicle distance while fuel saving control is being implemented, and acceleration is not performed if the inter-vehicle distance is equal to or longer than the target inter-vehicle distance. Because the fuel saving control is prioritized, only a functionality of the inter-vehicle distance maintenance for collision-prevention is enabled. Thereby, it is possible to maintain a safe inter-vehicle distance while prioritizing fuel saving control. In addition, if the fuel saving control is not being implemented, acceleration/deceleration control is performed such that a normal target inter-vehicle distance and target vehicle speed are maintained. Thereby, it is possible to make the vehicle speed close to the target vehicle speed while following the preceding vehicle 101.

Figure 6:
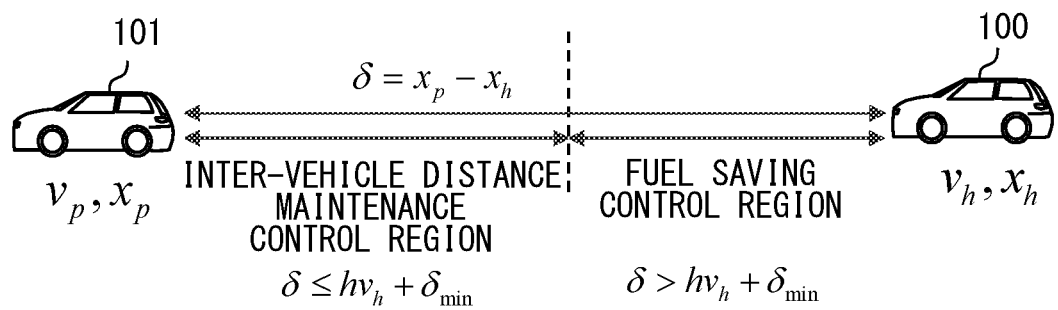
FIG. 6 is a figure for explaining a fuel saving control region.

Next, specific vehicle speed control is explained using a timing chart. As depicted in FIG. 6, an inter-vehicle distance maintenance control region and a fuel saving control region are set in accordance with an inter-vehicle distance. That is, if the inter-vehicle distance is equal to or shorter than the target inter-vehicle distance, the subject vehicle is under the inter-vehicle distance maintenance control region, and if the inter-vehicle distance is longer than the target inter-vehicle distance, the subject vehicle is under the fuel saving control region. In the inter-vehicle distance maintenance control region, acceleration/deceleration control for maintaining the inter-vehicle distance is implemented. In the fuel saving control region, acceleration/deceleration control for realizing fuel saving is implemented. In other words, if the inter-vehicle distance is equal to or shorter than the target inter-vehicle distance, inter-vehicle distance maintenance control is prioritized for safety, but if the inter-vehicle distance is longer than the target inter-vehicle distance, fuel saving control is prioritized.

Figure 7:
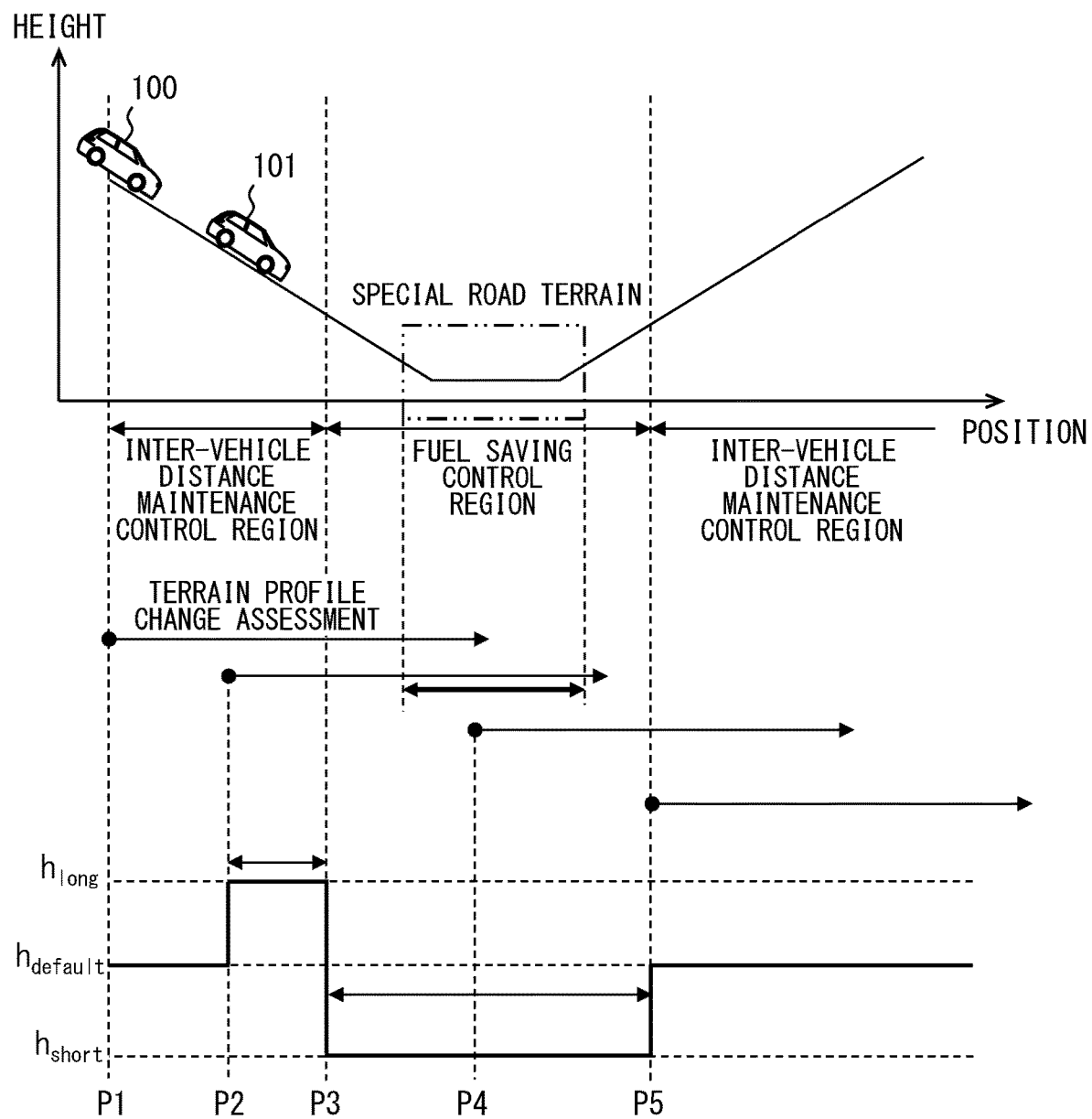
FIG. 7 is a timing chart for explaining vehicle speed correction control performed in a sag section.

A timing chart depicted in FIG. 7 depicts a case that there is a special road terrain which is a sag section located ahead of the subject vehicle, and there is also a preceding vehicle. At position P1, the special road terrain suitable for the fuel saving control is not sensed in terrain change assessment, and so pre-set inter-vehicle time $h_{default}$ which is a pre-set value is used. Here, the arrow of the terrain change assessment in FIG. 7 is equivalent to a special road terrain sensible range. In the terrain change assessment, it is assessed whether there is a special road terrain within the range of sensing ahead of the vehicle.

Thereafter, at position P2, the special road terrain suitable for the fuel saving control is sensed in the terrain change assessment. Accordingly, a long inter-vehicle time $h_{long}$ which is longer than the pre-set inter-vehicle time $h_{default}$ is set as the inter-vehicle time in preparation for future acceleration. Thereby, the inter-vehicle distance is artificially increased. In addition, because the special road terrain has been sensed, a road zone including the special road terrain is set as an energy efficiency zone. In addition, road zones before and after the energy efficiency zone are set as inter-vehicle distance maintenance zones.

Thereafter, because the inter-vehicle distance increases, and, at position P3, the energy efficiency zone is reached, the inter-vehicle distance maintenance control region turns into the fuel saving control region, and control is then performed to maintain the minimum inter-vehicle distance necessary for collision-prevention. In the fuel saving control region, the inter-vehicle time is set to a short inter-vehicle time $h_{short}$ which is shorter than the pre-set inter-vehicle time $h_{default}$. This is for setting the target inter-vehicle distance to the minimum inter-vehicle distance necessary for collision-prevention, and ensuring the largest fuel saving control region. In other words, this is speed control for minimizing a region of interference with a request to follow the preceding vehicle 101. Thereby, the target vehicle speed becomes a value larger than the pre-set vehicle speed, and acceleration is enabled by making use of the downhill before the uphill.

Thereafter, at position P4, the subject vehicle is travelling in the energy efficiency zone, and the fuel saving control continues. Because the subject vehicle has driven past the downhill at position P4, while the target vehicle speed is set to a speed slower than that on the downhill, the subject vehicle travels by inertia. Because the inertia is used, deceleration by braking to reach the target vehicle speed is not performed. In other words, speed control to improve energy efficiency using the inertia is implemented. Thereafter, because at position P5, the special road terrain suitable for the fuel saving control is not sensed in the terrain change assessment, and the energy efficiency zone has turned into the inter-vehicle distance maintenance zone, the fuel saving control region turns into the inter-vehicle distance maintenance control region and control for normal inter-vehicle distance maintenance is performed.

Figure 8:
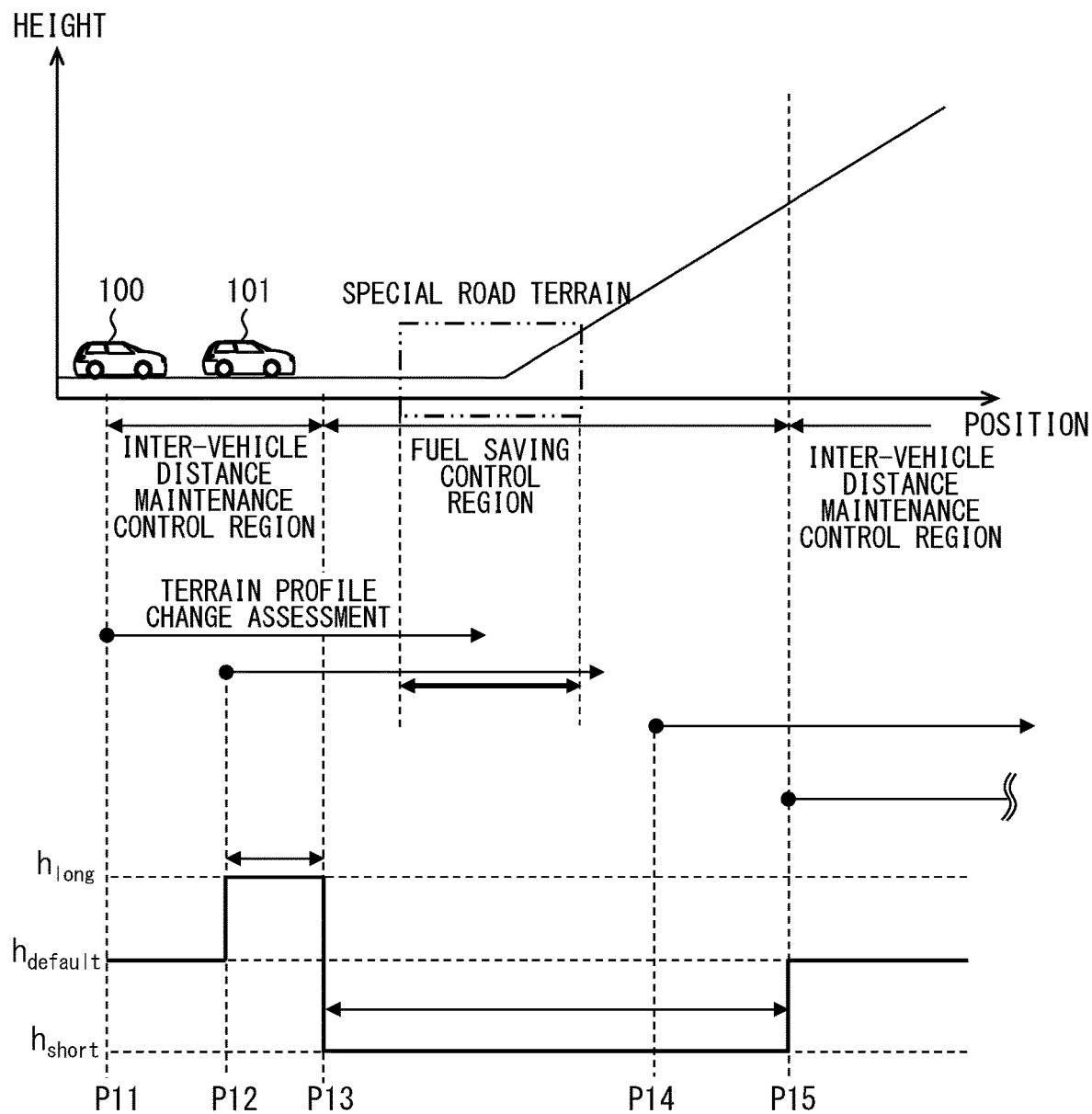
FIG. 8 is a timing chart for explaining vehicle speed correction control performed on an uphill road.

A timing chart depicted in FIG. 8 depicts a situation where there is a special road terrain which is an uphill road located ahead of the subject vehicle and there is also a preceding vehicle. At position P11, a special road terrain matching fuel saving control is not sensed in terrain change assessment, and so the pre-set inter-vehicle time $h_{default}$ which is a pre-set value is used.

Thereafter, at position P12, a special road terrain matching the fuel saving control is sensed in the terrain change assessment. Accordingly, long inter-vehicle time $h_{long}$ is set as the inter-vehicle time in preparation for future acceleration. Thereby, the inter-vehicle distance is artificially increased. In addition, because the special road terrain has been sensed, a road zone including the special road terrain is set as an energy efficiency zone. In addition, road zones before and after the energy efficiency zone are set as inter-vehicle distance maintenance zones.

Thereafter, because the inter-vehicle distance increases, and, at position P13, the energy efficiency zone is reached, the inter-vehicle distance maintenance control region turns into the fuel saving control region, and control is then performed to maintain the minimum inter-vehicle distance necessary for collision-prevention. In the fuel saving control region, the inter-vehicle time is set to a short inter-vehicle time $h_{short}$. This is for setting the target inter-vehicle distance to the minimum inter-vehicle distance necessary for collision-prevention, and ensuring the largest possible fuel saving control region. Thereby, the target vehicle speed becomes a value larger than the pre-set vehicle speed, and acceleration is enabled within the tolerance before entering the uphill road.

Thereafter, at position P14, the subject vehicle is travelling in the energy efficiency zone, and the fuel saving control keeps being implemented. Accordingly, the subject vehicle is driving up the uphill thanks to the inertia generated by acceleration performed in advance, and the target vehicle speed is set to a pre-set vehicle speed or less. This is because the subject vehicle travels on the uphill by the inertia. Thereafter, because at position P15, a special road terrain matching the fuel saving control is not sensed in the terrain change assessment, and the energy efficiency zone has turned into the inter-vehicle distance maintenance zone, the fuel saving control region turns into the inter-vehicle distance maintenance control region, and control for normal inter-vehicle distance maintenance is performed.

Figure 9:
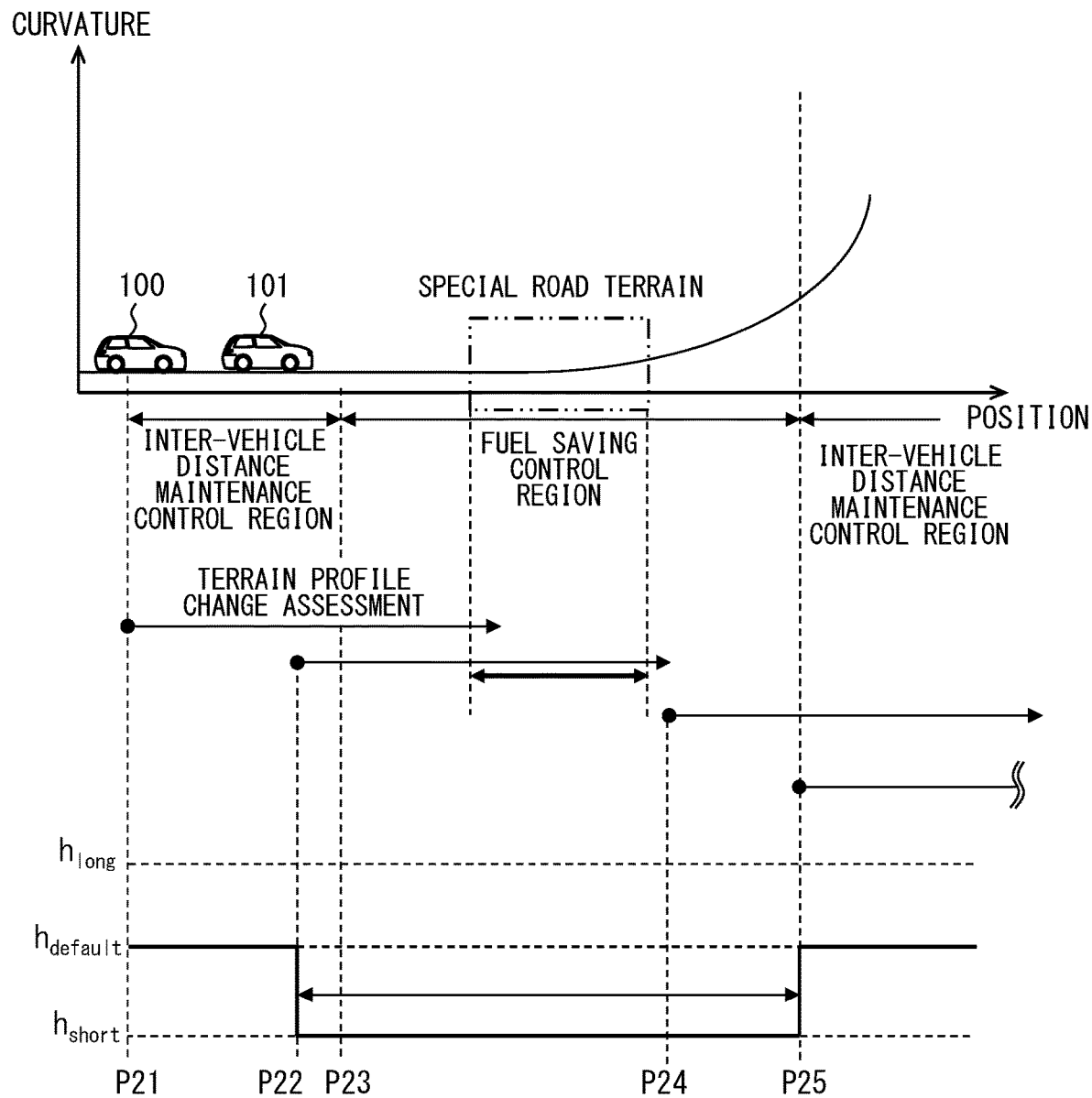
FIG. 9 is a timing chart for explaining vehicle speed correction control performed at a curve.

A timing chart depicted in FIG. 9 depicts a case that there is a special road terrain which is a curve located ahead of the vehicle, and there is also a preceding vehicle. At position P21, a special road terrain matching the fuel saving control is not sensed in terrain change assessment, and so the set inter-vehicle time $h_{default}$ which is a pre-set value is used.

Thereafter, at position P22, a special road terrain matching the fuel saving control is sensed in the terrain change assessment. Accordingly, the inter-vehicle time is set to the short inter-vehicle time $h_{short}$ such that the inter-vehicle distance is not too long at time of deceleration in the future before the curve. Thereby, the inter-vehicle distance is artificially reduced. In addition, because the special road terrain has been sensed, a road zone including the special road terrain is set as an energy efficiency zone. In addition, road zones before and after the energy efficiency zone are set as inter-vehicle distance maintenance zones.

Thereafter, because the inter-vehicle distance decreases, and, at position P23, the energy efficiency zone is reached, the inter-vehicle distance maintenance control region turns into the fuel saving control region, and control is then performed to maintain the minimum inter-vehicle distance necessary for collision-prevention. In the fuel saving control region, the inter-vehicle time also keeps being set to the short inter-vehicle time $h_{short}$. This is for setting the target inter-vehicle distance to the minimum inter-vehicle distance necessary for collision-prevention, and ensuring the largest possible fuel saving control region.

Thereafter, at position P24, the subject vehicle is travelling in the energy efficiency zone, and the fuel saving control keeps being implemented. Thereby, for deceleration at time of travelling along the curve, deceleration control that excels in energy efficiency is implemented by an engine brake functionality by cutting off a fuel or a brake functionality of recovering travelling energy. Thereafter, because at position P25, a special road terrain matching the fuel saving control is not sensed in the terrain change assessment, and the energy efficiency zone has turned into the inter-vehicle distance maintenance zone, the fuel saving control region turns into the inter-vehicle distance maintenance control region, and control for normal inter-vehicle distance maintenance is performed.

In the manner as described above, as depicted in FIG. 4, if there is no special road terrain located ahead, and additionally there is a preceding vehicle 101, the vehicle control apparatus 21 according to the present embodiment performs the speed control such that the vehicle speed becomes the pre-set vehicle speed while maintaining the subject vehicle with an inter-vehicle distance that is longer than the pre-set inter-vehicle distance. Thereby, if there is a preceding vehicle 101, the subject vehicle can travel at a pre-set vehicle speed while maintaining the subject vehicle with an inter-vehicle distance longer than the pre-set inter-vehicle distance.

In addition, if a special road terrain is located ahead and there is no preceding vehicle 101, as depicted FIG. 2, the speed control is performed to increase or decrease the speed of the subject vehicle 100 relative to the pre-set vehicle speed such that the energy efficiency is improved in the energy efficiency zone. Thereby, if no preceding vehicle 101 exists, the subject vehicle can travel at a vehicle speed for improving the energy efficiency.

Then, if a special road terrain is located ahead, there is a preceding vehicle 101, and the vehicle speed is planned to increase relative to the pre-set vehicle speed in the energy efficiency zone, as depicted in FIG. 7, the speed control is performed such that the inter-vehicle distance becomes longer than the pre-set inter-vehicle distance in the inter-vehicle distance maintenance zone. In a case that the vehicle speed is increased relative to the pre-set vehicle speed in the energy efficiency zone, it is necessary to increase the inter-vehicle distance because there is the preceding vehicle 101. Because, in view of this, the inter-vehicle distance is made longer than the pre-set inter-vehicle distance in the closer inter-vehicle distance maintenance zone, it is possible to prevent the subject vehicle from coming closer to the preceding vehicle 101 due to an increase in speed in the energy efficiency zone. Thereby, no matter whether or not there is a preceding vehicle 101, it is possible to implement speed control that excels in energy efficiency in accordance with a special road terrain located ahead of the vehicle.

In addition, if the special road terrain is located ahead, a preceding vehicle 101 exists, and the vehicle speed is planned to decrease relative to the pre-set vehicle speed in the energy efficiency zone, as depicted in FIG. 9, the speed control is performed such that the inter-vehicle distance becomes shorter than the pre-set inter-vehicle distance in the inter-vehicle distance maintenance zone. In a case that the vehicle speed is reduced relative to the pre-set vehicle speed in the energy efficiency zone, because there is the preceding vehicle 101, it is necessary to prevent the inter-vehicle distance from increasing too much at time of deceleration of the preceding vehicle 101. Because, in view of this, the inter-vehicle distance is made shorter than the pre-set inter-vehicle distance in the closer inter-vehicle distance maintenance zone, it is possible to implement fuel saving control while making the subject vehicle closer to the preceding vehicle 101 as a result of a vehicle speed reduction in the energy efficiency zone.

In addition, in the present embodiment, as explained with reference to FIG. 5, when the subject vehicle is travelling in the energy efficiency zone and a preceding vehicle 101 exists, the speed control to improve the energy efficiency is prioritized over the speed control to maintain the inter-vehicle distance at the pre-set inter-vehicle distance. Thereby, it is possible to improve the energy efficiency because the fuel saving control is prioritized in the energy efficiency zone.

Furthermore, in the present embodiment, as explained with reference to FIG. 6, if the inter-vehicle distance has become shorter than the minimum inter-vehicle distance shorter than the pre-set inter-vehicle distance when the subject vehicle is travelling in the energy efficiency zone and if a preceding vehicle 101 exists, the speed control to maintain the subject vehicle with an inter-vehicle distance longer than the minimum inter-vehicle distance is prioritized over the speed control to improve the energy efficiency. The minimum inter-vehicle distance is a synonym of the safe inter-vehicle distance. Thereby, it is possible to ensure the minimum inter-vehicle distance while performing the fuel saving control.

In addition, in the present embodiment, notification information representing that the speed control to improve the energy efficiency is planned to be performed or is being performed is output to another apparatus which is the vehicle display apparatus 39 in the present embodiment when the inter-vehicle distance is increased or reduced relative to the pre-set inter-vehicle distance in order to improve the energy efficiency or when the vehicle speed is increased or reduced relative to the pre-set vehicle speed in order to improve the energy efficiency. Thereby, the driver can grasp the content of speed control by the notification information. Accordingly, the driver can recognize a reason why the inter-vehicle distance is shorter than a normal inter-vehicle distance, or a reason why the actual vehicle speed is higher than a pre-set vehicle speed. Thereby, the driver can be given a sense of security.

Whereas the notification information is output by the vehicle display apparatus 39 in the present embodiment, such configuration is not the sole example. For example, the notification information may be output by sound, may be output by a mobile information terminal carried by the driver, or may be output by another apparatus that is mounted on the vehicle, and is capable of outputting the notification information.

In addition, in the vehicle control apparatus 21 according to the present embodiment, the processor 40 executes a vehicle travel control method of controlling the vehicle speed of the vehicle. According to the vehicle travel control method according to the present embodiment, as mentioned before, no matter whether or not there is a preceding vehicle 101, it is possible to execute speed control that excels in energy efficiency in accordance with a terrain shape located ahead of the vehicle.

Other Embodiments

Whereas preferred embodiments of the present disclosure have been explained thus far, the present disclosure is not restricted by the embodiments mentioned before at all, and can be implemented with various modifications within the scope not deviating from the gist of the present disclosure.

The structures of the embodiments mentioned before are merely depicted as examples, and the scope of the present disclosure is not limited to the scope of the descriptions. The scope of the present disclosure is depicted by the description of Claims, and furthermore incorporates all changes within the meaning and scope equivalent to the description of Claims.

Whereas the pre-set vehicle speed is set by the driver in the first embodiment mentioned before, such a manner of setting is not the sole example. For example, the pre-set vehicle speed may be set automatically in accordance with a legally permitted speed of a road.

Whereas special road terrains are realized by a sag section, an uphill road, and a curve in the first embodiment mentioned before, such terrains are not the sole examples. As long as there are zones where the energy efficiency can be enhanced, for example a change of the environment related to road surfaces may be considered, a change of legally permitted speeds may be considered, and the degree of congestion ahead may be used.

Functionalities that are realized by the vehicle control apparatus 21 in the first embodiment mentioned before may be realized by hardware and software that are different from those mentioned before, or a combination of these. For example, the vehicle control apparatus 21 may communicate with another control apparatus which may execute some or all of the processes. In a case that the control apparatus is realized by an electronic circuit, the electronic circuit can be realized by a digital circuit including a large number of logical circuits or an analog circuit.

Whereas the vehicle control apparatus 21 is used in a vehicle in the first embodiment mentioned before, the vehicle control apparatus 21 may be used not only in a state that it is mounted on a vehicle, but also in a state that the vehicle control apparatus 21 is not mounted on a vehicle at least partially.

The invention claimed is:

1. A vehicle travel control apparatus comprising
a processor programmed to:
acquire (i) positional information of a current position of a subject vehicle, (ii) preceding vehicle information concerning a preceding vehicle travelling in front of the subject vehicle, and (iii) road information concerning a road in front of the subject vehicle, the road information being acquired from a database;
determine, based on the acquired road information, whether a special road terrain exists in front of the subject vehicle, energy efficiency for the subject vehicle being improved as a result of speed control for the subject vehicle performed before the subject vehicle enters the special road terrain; and
control a speed of the subject vehicle to be a pre-set vehicle speed, wherein
an energy efficiency zone includes the special road terrain and is a road zone at which energy efficiency of the subject vehicle can be improved by increasing or decreasing the speed of the subject vehicle relative to the pre-set vehicle speed,
an inter-vehicle distance maintenance zone is a road zone before the energy efficiency zone, and
the processor is further programmed to:
when the special road terrain does not exist in front of the subject vehicle but a preceding vehicle exists, control the speed of the subject vehicle to be the pre-set vehicle speed while maintaining at least a pre-set inter-vehicle distance from the subject vehicle to the preceding vehicle;
when the special road terrain exists in front of the subject vehicle but a preceding vehicle does not exist, control the speed of the subject vehicle to increase or decrease relative to the pre-set vehicle speed in the energy efficiency zone such that the energy efficiency is improved; and
when (i) the special road terrain exists in front of the subject vehicle, (ii) a preceding vehicle exists, and (iii) the speed of the subject vehicle is planned to increase with respect to the pre-set vehicle speed in the energy efficiency zone, control the speed of the subject vehicle in the inter-vehicle distance maintenance zone such that an inter-vehicle distance from the subject vehicle to the preceding vehicle is longer than the pre-set inter-vehicle distance.

2. The vehicle travel control apparatus according to claim 1, wherein
the processor is further programmed to:
when (i) the special road terrain exists in front of the subject vehicle, (ii) a preceding vehicle exists, and (iii) the vehicle speed is planned to decrease with respect to the pre-set vehicle speed in the energy efficiency zone, control the speed of the subject vehicle in the inter-vehicle distance maintenance zone such that the inter-vehicle distance from the subject vehicle to the preceding vehicle is shorter than the pre-set inter-vehicle distance.

3. The vehicle travel control apparatus according to claim 1, wherein
the processor is further programmed to:
when the subject vehicle is travelling in the energy efficiency zone and a preceding vehicle exists, control the speed of the subject vehicle to prioritize improving the energy efficiency over maintaining the pre-set inter-vehicle distance.

4. The vehicle travel control apparatus according to claim 1, wherein
the processor is further programmed to:
when (i) the subject vehicle is travelling in the energy efficiency zone, (ii) a preceding vehicle exists, and (iii) a current inter-vehicle distance from the subject vehicle to the preceding vehicle is shorter than a safe inter-vehicle distance that is shorter than the pre-set inter-vehicle distance, control the speed of the subject vehicle to prioritize maintaining at least the safe inter-vehicle distance over improving the energy efficiency.

5. The vehicle travel control apparatus according to claim 1, wherein
the processor is further programmed to:
when (i) the inter-vehicle distance to a preceding vehicle is increased or reduced with respect to the pre-set inter-vehicle distance to improve the energy efficiency or when (ii) the speed of the subject vehicle is increased or decreased with respect to the pre-set vehicle speed to improve the energy efficiency, output, to another device, notification information indicating that the speed control to improve the energy efficiency is planned to be performed or is being performed.

6. A vehicle travel control method performed by at least one processor to control a speed of a subject vehicle, the vehicle travel control method comprising:
acquiring (i) positional information of a current position of the subject vehicle, (ii) preceding vehicle information concerning a preceding vehicle travelling in front of the subject vehicle, and (ii) road information concerning a road in front of the subject vehicle, the road information being acquired from a database;

determining, based on the acquired road information, whether a special road terrain exists in front of the subject vehicle, energy efficiency for the subject vehicle being improved as a result of speed control for the subject vehicle that is performed before the subject vehicle enters the special road terrain; and controlling the speed of the subject vehicle to be a pre-set vehicle speed, wherein an energy efficiency zone includes the special road terrain and is a road zone at which energy efficiency of the subject vehicle can be improved by increasing or decreasing the speed of the subject vehicle relative to the pre-set vehicle speed, an inter-vehicle distance maintenance zone is a road zone before the energy efficiency zone, and controlling the speed of the subject vehicle further includes:
when the special road terrain does not exist in front of the subject vehicle but a preceding vehicle exists, controlling the speed of the subject vehicle to be the pre-set vehicle speed while maintaining at least a pre-set inter-vehicle distance from the subject vehicle to the preceding vehicle;

when the special road terrain exists in front of the subject vehicle but a preceding vehicle does not exist, controlling the speed of the subject vehicle to increase or decrease relative to the pre-set vehicle speed in the energy efficiency zone such that the energy efficiency is improved;

when (i) the special road terrain exists in front of the subject vehicle, (ii) a preceding vehicle exists, and (iii) the vehicle speed is planned to increase with respect to the pre-set vehicle speed in the energy efficiency zone, controlling the speed of the subject vehicle in the inter-vehicle distance maintenance zone such that an inter-vehicle distance from the subject vehicle to the preceding vehicle is longer than the pre-set inter-vehicle distance; and when (i) the special road terrain exists in front of the subject vehicle, (ii) a preceding vehicle exists, and (iii) the vehicle speed is planned to decrease with respect to the pre-set vehicle speed in the energy efficiency zone, controlling the speed of the subject vehicle in the inter-vehicle distance maintenance zone such that the inter-vehicle distance from the subject vehicle to the preceding vehicle is shorter than the pre-set inter-vehicle distance.

* * * * *